US011241813B2

(12) United States Patent
Altonen et al.

(10) Patent No.: US 11,241,813 B2
(45) Date of Patent: Feb. 8, 2022

(54) SYSTEMS AND METHODS FOR AUTOTUNING PID CONTROL OF INJECTION MOLDING MACHINES

(71) Applicant: IMFLUX INC., Hamilton, OH (US)

(72) Inventors: Gene Michael Altonen, West Chester, OH (US); Brian Matthew Burns, Mason, OH (US)

(73) Assignee: IMFLUX INC., Hamilton, OH (US)

( * ) Notice: Subject to any disclaimer, the term of this patent is extended or adjusted under 35 U.S.C. 154(b) by 322 days.

(21) Appl. No.: 16/123,186

(22) Filed: Sep. 6, 2018

(65) Prior Publication Data

US 2019/0070762 A1 Mar. 7, 2019

Related U.S. Application Data

(60) Provisional application No. 62/583,858, filed on Nov. 9, 2017, provisional application No. 62/555,317, filed on Sep. 7, 2017.

(51) Int. Cl.
*B29C 45/77* (2006.01)
*B29C 45/78* (2006.01)
*B29C 45/76* (2006.01)

(52) U.S. Cl.
CPC ............ *B29C 45/77* (2013.01); *B29C 45/766* (2013.01); *B29C 45/78* (2013.01);
(Continued)

(58) Field of Classification Search
None
See application file for complete search history.

(56) References Cited

U.S. PATENT DOCUMENTS 5,427,720 A * 6/1995 Kotzab ............... B29C 35/0294
264/328.16
5,552,690 A 9/1996 Hiraoka
(Continued)

FOREIGN PATENT DOCUMENTS

CN 2892446 Y 4/2007
CN 103057071 A 4/2013
(Continued)

OTHER PUBLICATIONS

International Application No. PCT/US2018/049638, International Search Report and Written Opinion, dated Dec. 18, 2018.
(Continued)

*Primary Examiner* — Peter L Vajda
*Assistant Examiner* — Adrianna N Konves
(74) *Attorney, Agent, or Firm* — Marshall, Gerstein & Borun LLP (57) ABSTRACT

In order to reduce oscillations in process variables of an injection molding process, a variable-gain proportional-integral-derivative (PID) controller is utilized to control one or more of the process variables. The injection molding system may also include a tuning controller to automatically tune at least one of the proportional, integral, or derivative gains within a mold cycle. The tuning controller may obtain sensor data that monitors the operation of the injection molding machine to determine an adjustment to at least one of the proportional, integral, or derivative gains. The tuning controller may adjust the gains of the variable-gain PID controller in accordance with the determined adjustment to the at least one of the proportional, integral, or derivative gains.

20 Claims, 5 Drawing Sheets

(52) U.S. Cl.
CPC .......... *B29C 2945/7604* (2013.01); *B29C 2945/76056* (2013.01); *B29C 2945/76498* (2013.01); *B29C 2945/76949* (2013.01); *B29C 2945/76969* (2013.01)

(56) References Cited

U.S. PATENT DOCUMENTS

| | | | |
|---|---|---|---|
| 5,997,778 A * | 12/1999 | Bulgrin | B29C 45/77 264/328.1 |
| 6,081,751 A | 6/2000 | Luo et al. | |
| 6,108,587 A | 8/2000 | Shearer et al. | |
| 2009/0087510 A1 | 4/2009 | Hakoda et al. | |
| 2012/0179288 A1 | 7/2012 | Leung et al. | |
| 2013/0147078 A1 | 6/2013 | Matsubayashi et al. | |

FOREIGN PATENT DOCUMENTS

| | | |
|---|---|---|
| CN | 103158239 A | 6/2013 |
| JP | S62198429 A | 9/1987 |
| JP | H0655598 A | 3/1994 |
| JP | H08309816 A | 11/1996 |
| KR | 100661219 B1 | 12/2006 |
| WO | WO-2018/045143 A1 | 3/2018 |

OTHER PUBLICATIONS

Chinese Patent Application No. 201880057346.1, Office Action, dated Jul. 1, 2021.
Japanese Patent Application No. 2020-512736, Notice of Reasons for Refusal, dated Nov. 30, 2021.
Japanese Patent Application No. 2020-512744, Notice of Reasons for Refusal, dated Nov. 30, 2021.

* cited by examiner

SYSTEMS AND METHODS FOR AUTOTUNING PID CONTROL OF INJECTION MOLDING MACHINES

CROSS-REFERENCE TO RELATED APPLICATIONS

This application claims priority to U.S. Provisional Application No. 62/555,317, entitled "Systems and Methods for Autotuning PID control of Injection Molding", filed Sep. 7, 2017 and U.S. Provisional Application No. 62/583,858, entitled "Systems and Methods for Normalizing PID Control Across Injection Molding Machines", filed Nov. 9, 2017; the entirety of both of which are incorporated by reference herein.

FIELD OF THE INVENTION

This application relates generally to controlling an injection molding process and, more specifically, to controlling the injection molding process through the use of a variable-gain proportional-integral-derivative (PID) controller.

BACKGROUND OF THE INVENTION

Injection molding machines are commonly used to mold plastic objects. An injection molding machine molds plastic objects by repeatedly performing a mold cycle. During each mold cycle, the machine injects molten plastic into a mold, cools the plastic, opens the mold, ejects the molded object, closes the mold, and recovers for the next cycle. Various injection molding machines include variations of this mold cycle, as known in the art. A control system, which is programmed to execute a mold cycle, controls the machine according to the mold cycle.

In some conventional injection molding systems, the control system includes a proportional-integral-derivative (PID) controller. A PID controller compares current operation of the injection molding machine to a setpoint defined in the mold cycle. An error between the setpoint and the current operation is used to adjust a process variable. The adjustment calculated by the PID controller comprises three components: a proportional component generally indicative of present error; an integral component generally indicative of past error; and a derivative component generally indicative of a future predicted error. Each of these components is associated with a gain that adjusts the influence the component has on the control value generated by the PID controller.

In some further conventional molding systems, the gains for the proportional, integral, and derivative components are fixed throughout the mold cycle. However, fixed-gain PID control of the process variables is associated with relatively large oscillations as the PID controller adjusts the process variables in an effort to achieve a setpoint value. In the context of an injection molding process, this means that the molded product is less consistent between mold cycles resulting in a greater likelihood that a molded product contains an unacceptable defect.

In still further conventional molding systems, the mold cycle, including initial gain values for the PID controller, are simply copied from one injection molding machine to another. However, different injection molding machines may respond differently to the same control signals. Thus, despite executing the same mold cycle, different injection molding machines may produce a different molded product. In other words, executing the same mold cycle at different injection molding machines may increase the oscillations associated with the PID controller. As a result, these further conventional molding systems are produce less consistent results when executing a mold cycle across different injection molding machines.

SUMMARY OF THE INVENTION

However, embodiments of the present disclosure can be used to improve the operation of an injection molding machine by changing the fixed-gain PID controller to a variable-gain PID controller. In a variable-gain PID controller, the gains associated with at least one of the proportional, integral or derivative components are tuned within the mold cycle. In order to control how the variable-gain PID controller is tuned, the injection molding control system may also include a tuning controller. The tuning controller may analyze one or more operating conditions of the injection molding machine in order to automatically tune the variable-gain PID controller. In various embodiments, a controller of the injection molding machine acts as the tuning controller. In other embodiments, the tuning controller is a separate controller interconnected to the injection molding machine for the purpose of autotuning and/or normalizing the gains of the PID controller.

As compared to controlling an injection molding process using a fixed-gain PID controller, a variable-gain PID controller can reduce the number of oscillations that occur and/or reduce the magnitude of the oscillations that do occur. Reducing the oscillations improves how closely the performance of the injection molding machines matches the setpoints defined by the mold cycle. Reducing the oscillations also improves the consistency at which the injection molding machines produces molded parts. Improving the consistency of the injection molding machines reduces waste caused by defective products.

Figure 3:
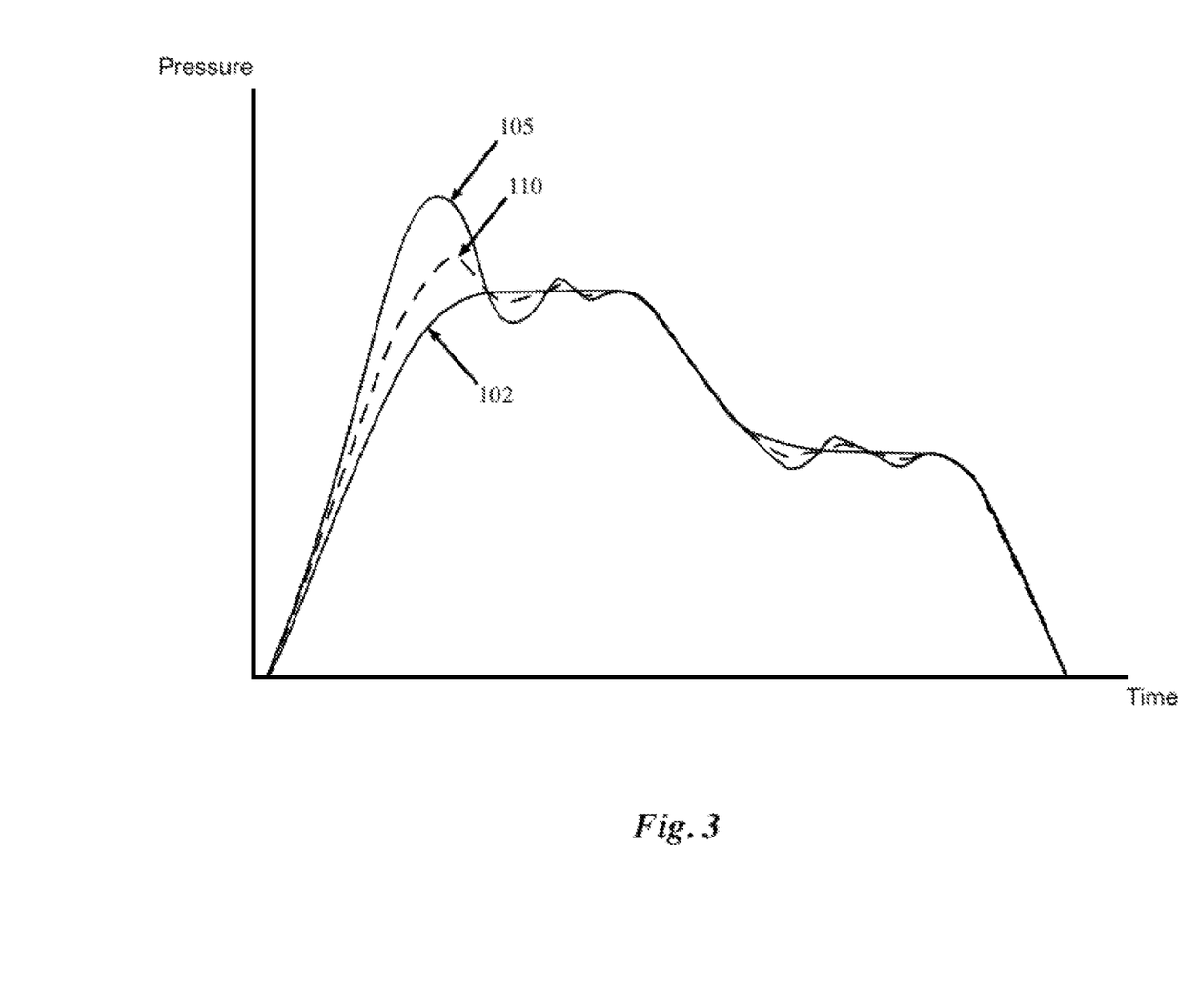
FIG. 3 is a comparison plot of injection pressure against time between a setpoint pressure, a pressure applied using a fixed gain PID controller, and a pressure applied using a variable gain PID controller.

With reference to FIG. 3, a comparison plot of injection pressure against time between a setpoint pressure 102, a pressure applied using a fixed-gain PID controller 105, and a pressure applied using a variable-gain PID controller 110 is illustrated. The setpoint pressure curve 102 may be defined by a mold cycle as a target pressure curve. As is illustrated on the comparison plot, the pressure curve for the fixed-gain PID controller 105 exhibits larger oscillations and takes longer to achieve steady-state than the pressure curve for the variable-gain PID controller 110.

In various embodiments, the tuning controller may be operatively connected to one or more sensors that monitor respective operating conditions of the injection molding machine. For example, one sensor may monitor a screw position; another sensor may monitor a velocity at which the screw rotates; still another sensor may monitor a mold cavity pressure; and yet another sensor may monitor a temperature of a thermoplastic material or of a heated barrel. The tuning controller can obtain the sensor data generated by the one or more sensors to automatically determine the tuning adjustments to one or more of the gains of the PID controller.

Further, different injection molding machines may exhibit different performance characteristics when following the same mold cycle. For example, some injection molding machines may be used more frequently than other injection molding machines. Accordingly, moving parts in the injection molding machine may exhibit higher or lower resistivity depending on the particular effects caused by wear and tear. As another example, different injection molding machines may be manufactured by different companies using different processes. These differences may be quantified and represented by the model of the injection molding machine.

To quantify these differences, the injection molding machines may be periodically subjected to a series of standardized performance measurements. The results of these measurements can be included in the model for the injection molding equipment. One such measurement is referred to as a "dead head" measurement and measures the pressure produced by the injection molding machine against a mold that has no cavity (i.e., against a flat surface). Another such measurement is referred to as a "purge pot" and measures a pressure generated when no mold is loaded into the injection molding machine.

In some embodiments, the mold may also be modeled. The model of the mold may include data associated with historic mold cycles executed by injection molding machines. For example, the data may include an identifier of the injection molding machine that executed the mold cycle, a plurality of injection pressure or injection velocity values sensed over the course of the mold cycle, or other characteristics of injection molding machine when executing the mold cycle.

In various embodiments, the tuning controller is also operatively connected to a model database that stores the models representative of the injection molding machines and the mold. The tuning controller can obtain the model corresponding to the injection molding machine to which the tuning controller is operative connected. In addition to the sensor data obtained from the one or more sensors, the tuning controller can analyze the model of the injection molding machine when automatically determining the tuning adjustments to one or more of the gains of the PID controller.

Analyzing the model of the injection molding machine further reduces the oscillations that occur, thereby further improving the consistency of the injection molding machine.

In some embodiments, the tuning controller normalizes the mold cycle for the injection molding machine based on the historic mold cycle data in the model of the mold. To this end, the tuning controller can compare the past operation of mold cycles to the parameters included in the model of the injection molding machine that executed the mold cycle. As a result, the tuning controller may determine a correlation between injection molding machine parameters and mold cycle performance for the mold. Based on this correlation, the tuning controller may normalize the execution of the mold cycle at the corresponding injection molding machine.

Normalizing the execution of the mold cycle may include adjusting initial gain values of the PID controller and/or other values associated with the mold cycle. For example, the tuning controller may adjust a melt temperature, a mold temperature, a screw rotation speed, or a switch-over position. By normalizing the execution of the mold cycle, the PID controller is able to reduce the error between setpoint values and process values, thereby reducing the oscillations that occur and improving molded product consistency. It should be appreciated that the aforementioned improvements in oscillation reduction are independent of the improvements achieved through the use of a variable-gain PID controller. Accordingly, normalization of the mold cycle reduces the oscillations that occur even in systems that include a fixed-gain PID controller.

In some embodiments, the variable-gain PID controller can control a pressure at which the injection molding machine injects a thermoplastic material into a mold. In these embodiments, the variable-gain PID controller can determine an error between a sensed injection pressure and a setpoint injection pressure indicated by the mold cycle.

In some other embodiments, the variable-gain PID controller can control a velocity at which the injection molding machine injects a thermoplastic material into a mold. In these embodiments, the variable-gain PID controller can determine an error between a sensed injection velocity and a setpoint injection velocity indicated by the mold cycle.

In some additional embodiments, two different variable-gain PID controllers can separately control the injection pressure and the injection velocity of the injection molding machine. Alternatively, the same variable-gain PID controller can control both the injection pressure and the injection velocity of the injection molding machine.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
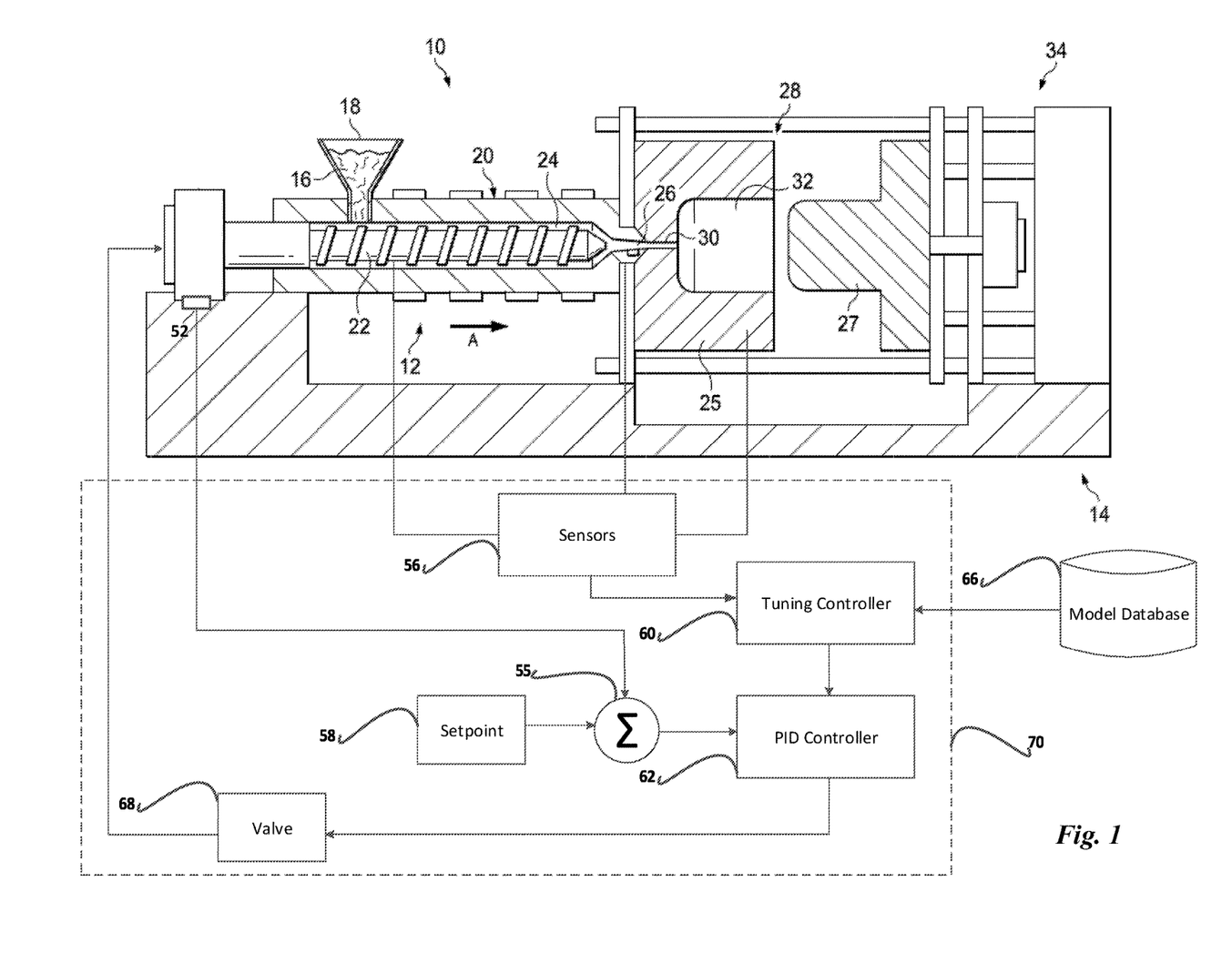
FIG. 1 illustrates a schematic view of an injection molding machine constructed according to the disclosure.

Referring to the figures in detail, FIG. 1 illustrates an exemplary injection molding machine 10 for producing thermoplastic parts in high volumes (e.g., a class 101 or 30 injection mold, or an "ultra-high productivity mold"), especially thinwalled parts having an L/T ratio of 100 or greater. The injection molding machine 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A variable-gain control system 70 is communicatively connected to the injection molding machine 10. The variable-gain control system 70 may include a sensor 52 configured to monitor a process parameter controlled by a proportional-integral-derivative (PID) controller 62. The process values for the process parameter monitored by the sensor 52 are compared to setpoint values 58 via an adder or comparator 55. The setpoint values 58 represent target values for the process parameter as defined by a mold cycle. In embodiments where the PID controller 62 controls an injection pressure, the sensor 52 may be a pressure sensor that measures (directly or indirectly) melt pressure of the molten thermoplastic material 24 in vicinity of the nozzle 26. Similarly, in embodiments where the PID controller 62 controls an injection velocity, the sensor 52 may be a velocity sensor that measures (directly or indirectly) a flow rate of the molten thermoplastic material 24 in vicinity of the nozzle 26. The output of the adder or comparator 55 is the error between the target process value and the actual sensed process value for the process parameter. This error is used as an input to the PID controller 62.

As is known in the art, the PID controller 62 converts the error into a proportional component, an integral component, and a derivative component. These components each correspond to a respective gain. The PID controller 62 multiplies each of the components by their respective gains and adds the resulting products to generate a control value for the process parameter. Based on the control value, the PID controller 62 adjusts a position of valve 68 to effect the control value in the injection molding system 12. Although the PID controller 62 adjusts a position of the valve 68 to effect the control value, alternative control devices (such as a well or a drive) are also envisioned.

The gains of the PID controller 62 are tuned by the tuning controller 60. The tuning controller 60 is operatively connected to one or more sensors 56. The one or more sensors 56 may directly or indirectly monitor characteristics of the injection molding system 12 or the molten thermoplastic material 24, such as melt pressure, temperature, viscosity, flow rate, etc. Some of the one or more sensors 56 may be located in the nozzle 26, while others of the one or more sensors 56 may be located at other locations within the injection system 12 or mold 28. For example, a sensor of the one or more sensors 56 may monitor a position of the screw 22 or a pressure in the mold cavity 32. Based on the sensor data generated by the one or more sensors 56, the tuning controller 60 may adjust one or more of the proportional gain, the integral gain, or the derivative gain of the PID controller 62.

In some embodiments, the tuning controller 60 is operatively connected to a model database 66. The model database 66 may store a model that details specific characteristics of the injection molding machine 10 and/or the mold 28. For example, the model may include information relating to a material associated with the injection molding machine 10 or the mold 28, a resistivity of one or more components of the injection molding machine 10, a known error for one or more process variables introduced by the injection molding machine 10, a purge pot pressure of the injection molding machine 10, and/or a dead head pressure of the injection molding machine 10. Accordingly, the tuning controller 60 may obtain and analyze the model for the injection molding machine 10 and/or the mold 28 when automatically tuning the gains of the PID controller 62.

In some embodiments, the tuning controller 60 may utilize a machine learning model that analyzes the model of the injection molding machine 10 to determine the adjustments. In these embodiments, the machine learning model may be trained on historical data of prior injection cycles, such as by using reinforcement learning techniques, to determine the relationship between the characteristics represented by the model and expected injection molding machine performance.

Figure 2:
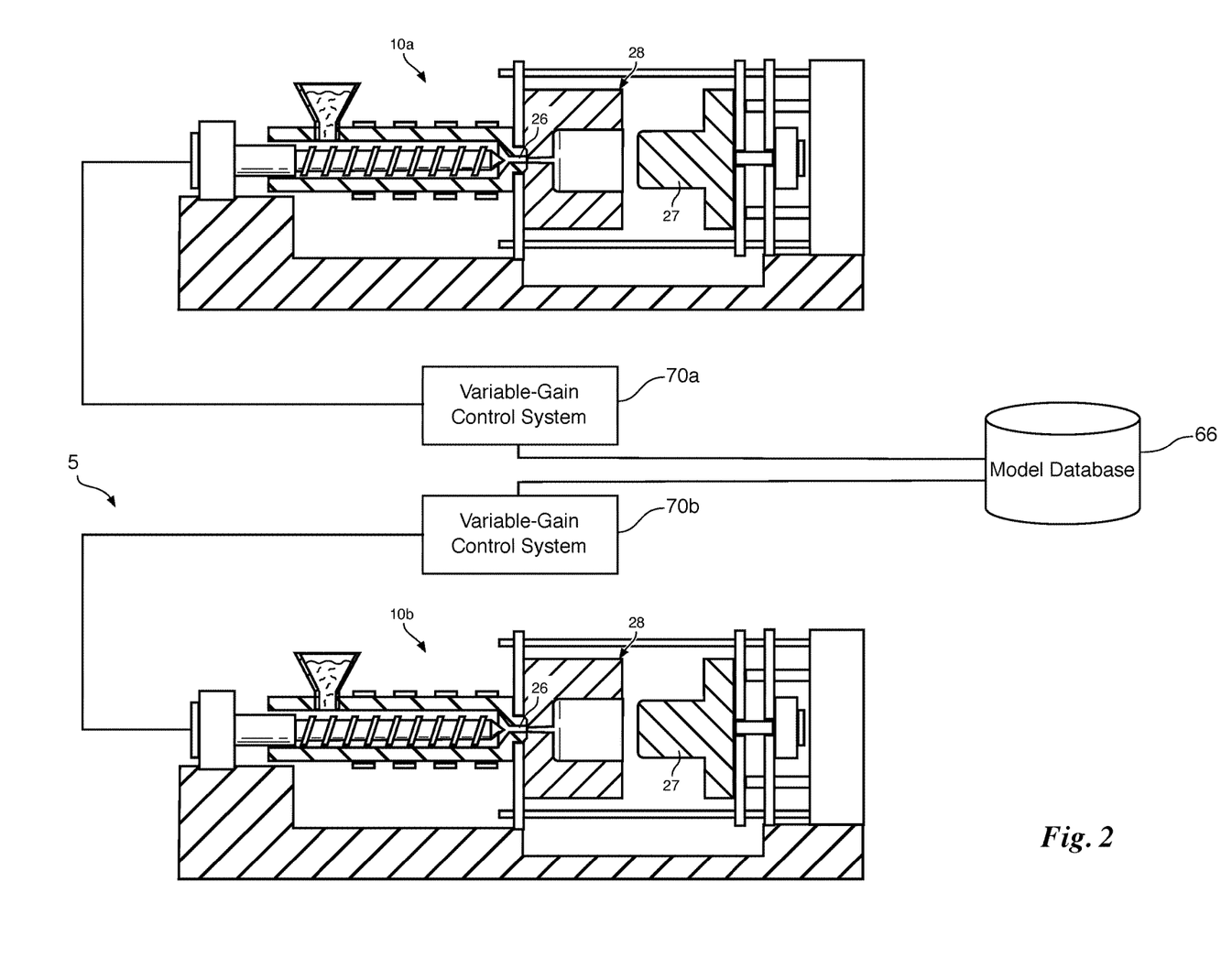
FIG. 2 illustrates a schematic view of an injection molding plant that incorporates multiple injection molding machines constructed according to the disclosure.

FIG. 2 illustrates a schematic view of an injection molding plant 5 that incorporates multiple injection molding machines 10a and 10b. Each of the injection molding machines 10a and 10b may be controlled by a corresponding variable-gain control system 70a and 70b. Each of the variable-gain control systems 70a and 70b may be operatively connected to the model database 66. Accordingly, the variable-gain control system 70a may obtain from the model database 66 a model corresponding to the injection molding machine 10a and the variable-gain control system 70b may obtain from the model database 66 a model corresponding to the injection molding machine 10b. In some alternate embodiments, the variable-gain control systems 70a and 70b are operatively connected to different model databases 66 that each maintain a copy of any model data.

In some embodiments, the mold 28 may be used to execute a mold cycle at the injection molding machine 10a at a first point in time. At a later point in time, the mold 28 may be moved to the injection molding machine 10b to execute one or more runs of the mold cycle. In this scenario, information about the mold 28 and/or the corresponding mold cycle observed during the run on the injection molding machine 10a can improve the performance of the execution of the mold cycle at the injection molding machine 10b. For example, one or more characteristics of the mold 28 may be derived based on a comparison between the model of the injection molding machine 10a and the measured performance of the injection molding machine 10a executing the mold cycle. In some embodiments, the variable-gain control system 70a stores the characteristics of the mold 28 and/or the measured performance in the model database 66 in the form of a model of the mold 28.

Prior to the injection molding machine 10b executing the mold cycle for the mold 28, the variable-gain control system 70b can access the model database 66 to obtain the stored model of the mold 28. The variable-gain control system 70b then determines a correlation between parameters stored in the model of the injection molding machine 10a to the measured performance of the past mold cycles stored in the model of the mold 28. Based on these differences, the variable-gain control system 70b applies the correlation to the model of the injection molding machine 10b to predict an expected performance of the injection molding machine 10b executing the mold cycle. The variable-gain control system 70b may then adjust one or more parameters of the mold cycle, including initial gain values for the variable gain PID controller of the variable-gain control system 70b, to improve the consistency and/or the accuracy with which the resulting molded product matches an intended output.

The tuning controller of the variable-gain control system 70b may also analyze the model of the mold 28 during the execution of the mold cycle. More particularly, the tuning controller of the variable-gain control system 70b may analyze the model of the mold 28 when tuning gains for a variable-gain PID controller of the variable-gain control system 70.

Figure 4:
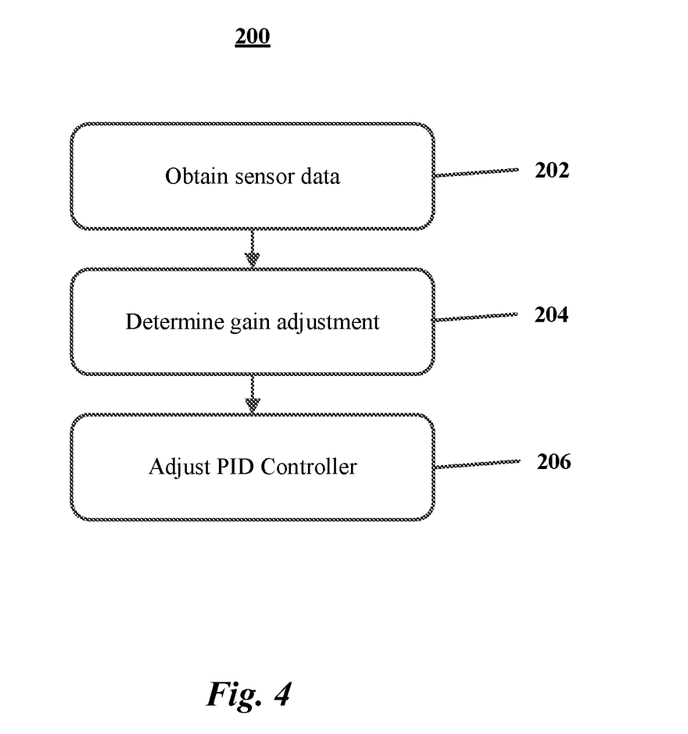
FIG. 4 illustrates an exemplary method for auto-tuning a variable-gain PID control of an injection molding machine.

FIG. 4 illustrates an exemplary method 200 for autotuning variable-gain PID control of an injection molding machine 10. The method 200 may be performed by a tuning controller 60 of a variable-gain control system 70 to automatically tune one or more gains of a PID controller 62 of the variable-gain control system 70. More particularly, the tuning controller 60 may automatically tune the gains of the PID controller 62 within a mold cycle that defines a plurality setpoint values for a process variable. In some embodiments, the process variable is an injection pressure of the injection molding machine 10. In other embodiments, the process variable is an injection velocity of the injection molding machine 10. It should be appreciated, that the tuning controller 60 may repeatedly perform the exemplary method 200 throughout the mold cycle.

The exemplary method 200 begins by the tuning controller 60 obtaining, from one or more sensors 56, sensor data indicative of the operation of the injection molding machine 10 (block 202). The sensor data may indicate a position of a screw 22, a pressure sensed within a mold cavity 32, a velocity at which the screw 22 rotates, a temperature of a thermoplastic material, a viscosity of the thermoplastic material, and/or other sensor data indicative of the operation of the injection molding machine 10. In some embodiments, for each type of sensor data, the tuning controller 60 maintains one or more historical values. For example, the tuning controller 60 may not just obtain current values generated the one or more sensors 56, but also an indication of a rate of change for the values generated by the one or more sensors 56.

Based on the obtained sensor data, the tuning controller may determine an adjustment for at least one of a first gain associated with a proportional component of the PID controller 62, a second gain associated with an integral component of the PID controller 62, or a third gain associated with a derivative component of the PID controller 62 (block 204). For example, a screw position sensor may indicate that the screw 22 is approaching a fully stoked position. Accordingly, the tuning controller 60 may determine that the second gain associated with the integral component of the PID controller 62 should be reduced.

In some embodiments, the tuning controller 60 may query a model database to obtain a model of the injection molding machine 10. The tuning controller 60 may utilize the model for the injection molding machine 10 in determining the adjustment for the first, second or third gains. For example, the model may provide an indication of how sensitive the injection molding machine 10 is to changes in the first, second, or third gains. Returning to the screw position example where the sensor data from the screw position sensor may indicate that the second gain associated with the integral component of the PID controller 62 should be reduced, the tuning controller 60 may analyze the model for the injection molding machine 10 to determine an amount by which the second gain associated with the integral component of the PID controller 62 should be reduced. As another example, the tuning controller 60 may utilize a machine learning model that analyzes the model of the injection molding machine 10 to determine the adjustments.

Using the determined adjustments, the tuning controller 60 may adjust the first, second, or third gains of the PID controller 62 (block 206). To this end, the PID controller 62 may include one or more interfaces to receive commands to configure the first, second, or third gains. The interfaces may include application-layer interfaces, such as an application programming interface (API), and a communication interface, such as a wired or wireless communication link. The tuning controller 60 may generate a command to adjust one of the first, second, or third gains in a format defined by the API of the PID controller 62 and transmit the command to the PID controller 62 via the wired or wireless communication link.

Figure 5:
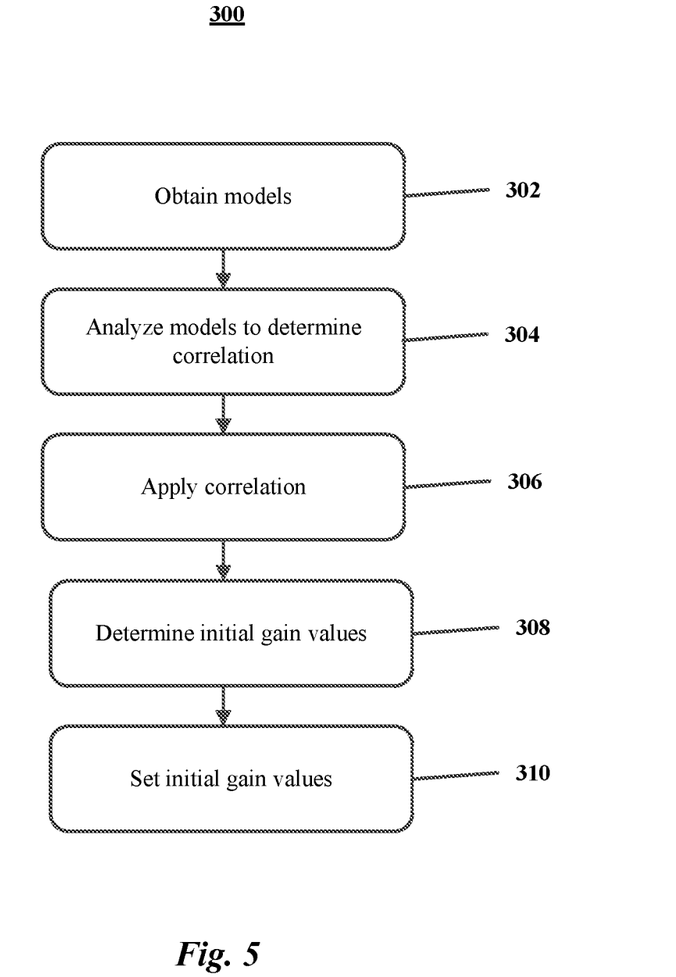
FIG. 5 illustrates an exemplary method for normalizing variable-gain PID control of an injection molding machine.

FIG. 5 illustrates an exemplary method for normalizing control of an injection molding machine 10. The method 300 may be performed by a tuning controller 60 of a variable-gain control system 70b to set one or more initial gain values of a PID controller 62 of the variable-gain control system 70b. More particularly, the tuning controller 60 may set the initial gain values for the PID controller 62 prior to executing a mold cycle. In some embodiments, the PID controller 62 controls an injection pressure of the injection molding machine 10b. In other embodiments, the PID controller 62 controls an injection velocity of the injection molding machine 10. It should be appreciated that the tuning controller 60 may repeatedly perform the exemplary method 300 after each execution of the mold cycle within a production run.

The exemplary method 300 begins by obtaining, from a model database 66, a model for an injection molding machine 10a, a model for injection molding machine 10b, and a model for a mold 28 (block 302). The models for the injection molding machines 10a and 10b may indicate a purge pot or a dead head injection pressure, a known error for a process value, a resistivity for a component of the injection molding machines 10a or 10b, and/or other data describing characteristics of the injection molding machines 10a and 10b. The model for the mold 28 may indicate measured performance characteristics of the injection molding machine 10a executing the mold cycle, a number of mold cycles executed using the mold 28, and/or other characteristics of the mold 28.

The tuning controller 60 may then analyze the model of the injection molding machine 10*a* and the model of the mold 28 to determine a correlation between injection molding machine parameters and mold cycle performance when executing the mold cycle using the mold 28 (block 304). As one example, the model of the mold 28 may indicate that mold cavity pressure tends to overshoot the preferred peak pressure during the pack phase of the mold cycle. Based on the historical performance characteristics, the tuning controller 60 may identify that overshooting occurs more frequently in injection molding machines that have a higher resistivity in a clamping system 14. In some embodiments, these correlations may be stored as part of the model of the mold 28.

As another example, as the mold 28 is used to execute multiple mold cycles, the mold 28 experiences wear and tear. Accordingly, over time, the thermoplastic material injected into the mold 28 experiences different levels of friction. To account for these differences, the tuning controller 60 records data indicative of cavity friction after each mold cycle to the model of the mold 28. In this example, the tuning controller 60 analyzes the model of the mold 28 to adjust the mold cycle to account for changes in mold friction.

After determining any correlations between injection molding machine parameters and mold cycle performance, the tuning controller 60 may then apply these correlations to the model of the injection molding machine 10*b* to predict an expected performance for the injection molding machine 10*b* when executing the mold cycle (block 306). More particularly, the tuning controller 60 may identify a deviation between a predicted performance characteristics and specified requirements or optimal values for the performance characteristics of the mold cycle. Returning to the previous example, the model of the injection molding machine 10*b* may indicate a clamping resistivity that is similar to those injection molding machines that tend to overshoot the peak cavity pressure.

Similarly, hydraulic injection molding machines and electric injection molding machines may respond differently to the same mold cycle. In some embodiments, the tuning controller 60 analyzes the model of the injection molding machine 10*b* to identify whether the injection molding machine 10*b* is a hydraulic or electric injection molding machine. Accordingly, in this example, when the tuning controller 60 applies the correlations to the model 10*b*, the tuning controller 60 incorporates learned knowledge of how hydraulic or electric injection molding machines respond to controlled inputs. As another example, the tuning controller 60 may utilize a machine learning model that analyzes the model of the injection molding machine 10 and/or the mold 28 to predict the expected performance for the injection molding machine 10*b*.

To correct the deviation, the tuning controller 60 may determine one or more initial gain values for the PID controller 62 (block 308). For example, the tuning controller 60 may increase the gain on the derivative component of the PID controller 62 to help prevent the injection molding machine 10*b* from exceeding the peak pressure. In some embodiments, the amount by which the gain is adjusted is based on properties included in the model of the injection molding machine 10*b*. Additionally or alternatively, the tuning controller 60 may determine an adjustment for a characteristic of the mold cycle. For example, the tuning controller 60 may adjust at least one of a melt temperature, a mold temperature, a screw rotation speed, or a switch-over position for the injection molding machine 10*b*. As another example, the tuning controller 60 may adjust one or more setpoint values for a process value controlled by the PID controller 62.

Using the determined initial gain values, the tuning controller 60 may set the initial gain values for the first, second, or third gains of the PID controller 62 (block 310). As described with respect to the method 200, the PID controller 62 may include one or more interfaces to receive commands to configure the first, second, or third gains. Accordingly, the tuning controller 60 may generate a command to adjust one of the first, second, or third gains in a format defined by an API of the PID controller 62 and transmit the command to the PID controller 62 via a wired or wireless communication link. Similarly, the tuning controller 60 may adjust the mold cycle using the determined adjustment.

After setting the initial values of the PID controller 62, the tuning controller 60 may execute the mold cycle, such as by performing the example method 200. In some embodiments, after executing the mold cycle, the tuning controller 62 updates the model of the mold 28 to include characteristics describing the just-executed mold cycle.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding system comprising:
   an injection molding machine;
   a pressure sensor configured to sense an injection pressure;
   a proportional-integral-derivative (PID) controller operatively connected to the pressure sensor and configured to control the injection pressure of the injection molding machine based upon an error between the sensed injection pressure and a pressure setpoint indicated by a control model, the PID controller having (i) a first gain associated with a proportional component; (ii) a second gain associated with an integral component; and (iii) a third gain associated with a derivative component;
   at least one other sensor configured to generate sensor data indicative of other operating parameters of the injection molding machine; and
   a tuning controller operatively connected to the at least one other sensor and to the PID controller, wherein within a mold cycle that defines a plurality of setpoint injection pressure values, the tuning controller is configured to:
   obtain, from the at least one other sensor, the generated sensor data;
   based on the sensor data, determine a gain adjustment for at least one of the first, second, and third gains; and
   adjust, using the determined gain adjustment, at least one of the first, second, and third gains.

2. The injection molding system of claim 1, wherein the at least one other sensor includes a screw position sensor.

3. The injection molding system of claim 1, wherein the at least one other sensor includes a cavity pressure sensor.

4. The injection molding system of claim 1, wherein the at least one other sensor includes a screw velocity sensor.

5. The injection molding system of claim 1, wherein the at least one other sensor includes a temperature sensor.

6. The injection molding system of claim 1 wherein to control the injection pressure of the injection molding machine, PID controller is configured to:
adjust a position for a pressure valve.

7. The injection molding system of claim 1, further comprising:
a machine model database configured to store a model of the injection molding machine.

8. The injection molding system of claim 7, wherein to determine the gain adjustment for at least one of the first, second, and third gains, the tuning controller is configured to:
obtain, from the machine model database, the model corresponding to the injection molding machine; and
based on the obtained model and the sensor data, determine the gain adjustment for at least one of the first, second, and third gains.

9. An injection molding system comprising:
an injection molding machine;
a velocity sensor configured to sense an injection velocity;
a proportional-integral-derivative (PID) controller operatively connected to the velocity sensor and configured to control the injection velocity of the injection molding machine based upon an error between the sensed injection velocity and a velocity setpoint indicated by a control model, the PID controller having (i) a first gain associated with a proportional component; (ii) a second gain associated with an integral component; and (iii) a third gain associated with a derivative component;
at least one other sensor configured to generate sensor data indicative of other operating parameters of the injection molding machine; and
a tuning controller operatively connected to the at least one other sensor and to the PID controller, wherein within a mold cycle that defines a plurality of setpoint injection pressure values, the tuning controller is configured to:
obtain, from the at least one other sensor, the generated sensor data;
based on the sensor data, determine a gain adjustment for at least one of the first, second, and third gains; and
adjust, using the determined gain adjustment, at least one of the first, second, and third gains.

10. The injection molding system of claim 9, wherein the at least one other sensor includes a screw position sensor.

11. The injection molding system of claim 9, wherein the at least one other sensor includes a cavity pressure sensor.

12. The injection molding system of claim 9, wherein the at least one other sensor includes a screw pressure sensor.

13. The injection molding system of claim 9, wherein the at least one other sensor includes a temperature sensor.

14. The injection molding system of claim 9, further comprising:
a machine model database configured to store a model of the injection molding machine.

15. The injection molding system of claim 14, wherein to determine the gain adjustment for at least one of the first, second, and third gains, the tuning controller is configured to:
obtain, from the machine model database, the profile corresponding to the injection molding machine; and
based on the obtained model and the sensor data, determine the gain adjustment for at least one of the first, second, and third gains.

16. A method for controlling injection molding machine, the method comprising:
obtaining, from one or more sensors monitoring the injection molding machine, sensor data indicative of an operating parameter of the injection molding machine;
determining, based on the sensor data, a gain adjustment for a proportional-integral-derivative (PID) controller that drives operation of a screw of the injection molding machine, the PID controller having (i) a first gain associated with a proportional component; (ii) a second gain associated with an integral component; and (iii) a third gain associated with a derivative component; and
adjusting, using the determined gain adjustment, at least one of the first, second, and third gains of the PID controller.

17. The method of claim 16, further comprising:
obtaining, from an machine model database, a model representative of the injection molding machine.

18. The method of claim 17, wherein determining the gain adjustment for the PID controller comprises:
determining, based on the obtained model and the sensor data, the gain adjustment.

19. The method of claim 17, wherein adjusting the gain adjusting at least one of the first, second, or third gains of the PID controller the PID controller to alter an injection pressure of the injection molding machine.

20. The method of claim 17, wherein adjusting the gain adjusting at least one of the first, second, or third gains of the PID controller the PID controller alter an injection velocity of the injection molding machine.

* * * * *

UNITED STATES PATENT AND TRADEMARK OFFICE
CERTIFICATE OF CORRECTION

PATENT NO. : 11,241,813 B2
APPLICATION NO. : 16/123186
DATED : February 8, 2022
INVENTOR(S) : Gene Michael Altonen et al.

It is certified that error appears in the above-identified patent and that said Letters Patent is hereby corrected as shown below:

In the Claims

Column 11, Line 44, In Claim 9, "injection pressure values" should be -- injection velocity values --.

Column 12, Line 38, In Claim 17, "an" should be -- a --.

Column 12, Line 45, In Claim 19, "adjusting at" should be -- comprises adjusting at --.

Column 12, Line 46, In Claim 19, "PID controller the PID controller" should be -- PID controller --.

Column 12, Line 49, In Claim 20, "adjusting at" should be -- comprises adjusting at --.

Column 12, Line 50, In Claim 20, "PID controller the PID controller" should be -- PID controller --.

Signed and Sealed this
Twentieth Day of September, 2022

Katherine Kelly Vidal
*Director of the United States Patent and Trademark Office*